(12) United States Patent
Coyac et al.

(10) Patent No.: US 6,577,035 B2
(45) Date of Patent: Jun. 10, 2003

(54) SEALED MOTOR ROTOR WITH BALL BEARING

(75) Inventors: Cyrille Coyac, St Privat des Vieux (FR); Jean-Paul Vinay, St Hilaire de Brethmas (FR); Marc Gingeyne, St Etienne de l'Olm (FR)

(73) Assignee: Crouzet Automatismes, Valence (FR)

( * ) Notice: Subject to any disclaimer, the term of this patent is extended or adjusted under 35 U.S.C. 154(b) by 0 days.

(21) Appl. No.: 09/914,469

(22) PCT Filed: Dec. 28, 2000

(86) PCT No.: PCT/FR00/03722
§ 371 (c)(1),
(2), (4) Date: Aug. 29, 2001

(87) PCT Pub. No.: WO01/50576
PCT Pub. Date: Jul. 12, 2001

(65) Prior Publication Data
US 2002/0135248 A1 Sep. 26, 2002

(30) Foreign Application Priority Data
Dec. 30, 1999 (FR) .............................................. 99 16771

(51) Int. Cl.$^7$ ................................................. H02K 7/02
(52) U.S. Cl. ............................. 310/90; 310/89; 310/85; 29/596; 29/598
(58) Field of Search ............................. 310/90, 89, 85, 310/91, 49 R; 29/596, 597, 598, 898, 898.11

(56) References Cited

U.S. PATENT DOCUMENTS

4,922,406 A * 5/1990 Schuh ...................... 360/97.03
5,254,892 A * 10/1993 Bosman et al. ........... 310/49 R

FOREIGN PATENT DOCUMENTS

| CH | 315 972 | 9/1956 |
| DE | 29 39 560 | 4/1981 |
| DE | 40 23 756 | 12/1991 |
| EP | 0 893 636 | 1/1999 |
| FR | 2 620 876 | 3/1989 |

OTHER PUBLICATIONS

Patent Abstract of Japan, JP 3–212140, Sep. 17, 1991.

* cited by examiner

*Primary Examiner*—Thanh Lam
(74) *Attorney, Agent, or Firm*—Oblon, Spivak, McClelland, Maier & Neustadt, P.C.

(57) ABSTRACT

The disclosure relates to an electric motor including a support block containing a ball bearing housing, a rotor that projects from this housing, and a stator assembly mounted around said rotor and fastened on said support block, characterized in that an annular seal, preferably of O-ring type, is squeezed between said stator assembly and the periphery of the fixed race of said ball bearing, the pressure of said annular seal preventing axial and rotational movement of said fixed race; the invention also proposes an assembly process for such an electric motor. The invention is notably suitable for sealed rotor motors.

8 Claims, 2 Drawing Sheets

SEALED MOTOR ROTOR WITH BALL BEARING

The invention mainly relates to sealed rotor motors for applications in which it is required to avoid contact between the stator of the motor and a dangerous liquid or gaseous environment.

A typical example of the application of such a motor is the control of a valve that shuts off the flow of gas to a boiler. The electrical parts of the motor (in practice the stator) must not be in contact with the gas. There are of course many other applications of such motors.

These motors are often constructed in the following manner: a rotor assembly equipped with a ball bearing is mounted in a massive support block that forms a partition separating the rotor environment from the stator environment. The ball bearing is mounted in a housing in this support block with the rotor projecting outside the housing. A stator assembly is mounted around the rotor and is fastened to the support block by screws, for example.

The present invention notably concerns the fitting of the ball bearing in the support block.

Since the invention is advantageously (though not exclusively) applicable to sealed rotor motors, before indicating the object of the invention, we shall also explain how the invention provides for sealing of the motor.

In a sealed rotor motor, it is necessary to separate the environment on the rotor side from the environment on the stator side and prevent for example any flow of gas via the ball bearing or via the air gap between the rotor and stator. To do this, a sealing bell is used to enclose the whole rotor assembly. The lateral, cylindrical, nonmagnetic wall of this bell is inserted into the rotor/stator air gap. The whole stator assembly, notably including the conductors feeding the stator, is located outside the bell. The bell also makes sealed contact with the support block, in other words with the solid wall separating the stator environment from the rotor environment, thereby ensuring that the two environments are separated from each other in a gas-tight manner. The bell encloses not only the rotor but also the ball bearing.

The invention proposes a particular way of mounting the ball bearing in the support block that is notably suitable for sealed rotor motors.

The ball bearing fits in the housing provided in this support block; the housing diameter is adjusted so that the bearing can be hand-fitted in the housing tightly but without friction. In prior art solutions the ball bearing was force-fitted; in some solutions in which it was hand-fitted a metal tongue or other means was necessary to immobilize-rotationally and axially—the fixed bearing race in the housing.

In the present invention, the fixed bearing race is immobilized by means of an elastic annular seal, preferably of O-ring type, inserted between the stator assembly of the motor and the periphery of the fixed race and compressed by the fastening of the stator assembly on the support block.

Once the ball bearing has been hand-fitted into the support block, with the rotor projecting outside this housing, the stator assembly is mounted around the rotor then fixed onto the support block, in general by screws, which also squeezes the annular seal against the fixed race of the bearing. This pressure also holds the bearing firmly in its housing, and the friction of the seal prevents the fixed race from rotating under the influence of the rotation of the rotor.

The invention is therefore an electric motor including a support block containing a ball bearing housing, a rotor that projects from this housing, and a stator assembly mounted around said rotor and fastened on said support block, characterized in that an annular seal, preferably of O-ring type, is squeezed between said stator assembly and the periphery of the fixed race of said ball bearing, the pressure of said annular seal preventing axial and rotational movement of said fixed race.

In the case of a sealed motor including a bell that encloses the rotor, the open end of the bell is bent radially outwards to form a rim (whose plane is therefore parallel to the plane of the annular seal) which is inserted between the stator assembly and the annular seal. This rim of the bell is held pressed against the seal by the tightening of the stator assembly on the support block. The seal bears not only on the periphery of the fixed bearing race (but without making a seal at this point), but also on part of the support block, which ensures sealing between the bell and the support block around the periphery of the bell.

The ball bearing housing preferably has, on the side on which the bearing is inserted, a peripheral section of diameter slightly greater than that at the bottom of the housing which holds the fixed bearing race, said seal being fitted in this wider section, the diameter and radial thickness of the seal being chosen such that the periphery of the seal presses against the internal cylindrical wall of this wider section.

With the arrangement of parts according to the invention, the bearing is not subjected to any excessive forces, which avoids any risk of deformation and enables optimal operation.

The degree of compression of the seal enables dimensional variations of the various parts to be taken into account in the presence of large temperature gradients, in order to ensure that the bearing remains firmly immobilized despite these temperature variations.

In the case of a sealed rotor motor the invention also provides for sealing.

Finally, the invention also includes an assembly process for the electric motor, including the following steps: preparation of a rotor assembly including a rotor and a ball bearing; fitting of this assembly in a ball bearing housing in a support block, with said rotor projecting outside the housing; fitting of an annular seal, preferably of O-ring type, against the fixed race of said ball bearing; fitting of a stator assembly around the rotor; and tightening of said stator assembly against said support block, this tightening squeezing said annular seal against said fixed race. For a sealed rotor motor, said stage of fitting of the stator assembly is preceded by a stage of fitting of a non magnetic sealing bell around said rotor, said bell having a rim bent radially outwards that presses against said annular seal and said stator assembly pressing against this rim to press it against said annular seal.

The invention will be better understood and other characteristics and advantages will become clear on reading the following detailed description of a preferred embodiment, given only as a non-limitative example, with reference to the attached drawings of which:

The invention will be described taking the example of a sealed stepping rotor motor used to control a gas flow control valve feeding a boiler gas. However, other applications are possible.

Figure 1:
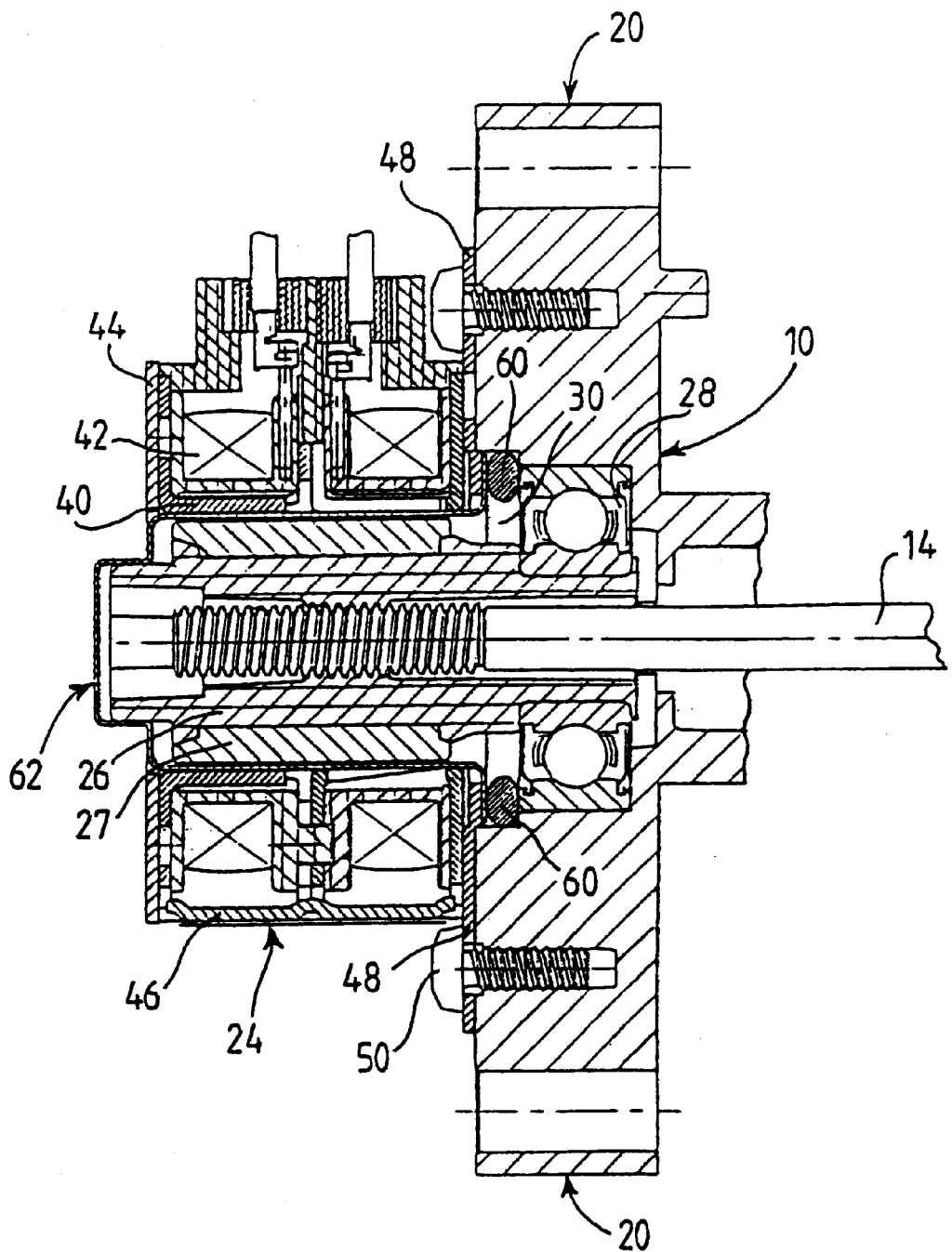
FIG. 1 shows a general view of an embodiment of motor according to the invention.

The stepping motor is mounted on a massive support block 10 which forms a partition separating the gas-filled environment from the external environment. The body of the valve controlled by this motor is not shown in the figure. The valve is controlled via a shaft or rod 14 that can move longitudinally. The body of the solenoid valve encloses the end of the rod 14 and is closed by the face of the support block 10 on the right side of FIG. 1.

The role of the motor is to drive the rod 14 longitudinally, for example to open or close an aperture (not shown in the figure).

The massive support block 10 includes a transversal part 20 in form of a flange (hereinafter referred to as the "flange 20") on which the valve body and motor stator can be fixed, respectively on the right and on the left of the flange 20. This support block 10 has an axial hole to allow the rod 14 to penetrate it.

The actual electric motor is essential composed of a stator assembly 24, a rotor 26, and a ball bearing 28. The stator assembly and the rotor are mounted on the left of the flange 20 in the figures. The ball bearing is fitted in a housing 30 in the flange 20. The rod 14 extends on both sides of the flange 20, via a hole in the bottom of this housing 30.

The rotor is preferably composed of permanent magnets 27 distributed around the periphery of a rotor body preferably made of plastic material.

The stator includes pole pieces 40 enclosed in electrical coils 42 which, when mounted, face the rotor composed of permanent magnets. This rotor zone is located outside the support block 10 (on the left of the figures).

Along part of its length the rod 14 is threaded on the outside; this threaded section engages corresponding threads on the inside of the rotor. Means (not shown) are provided to prevent rotation of the rod 14 so that, when the rotor turns, the rod 14 moves longitudinally but not rotationally.

The stator assembly 24, constituted by the pole pieces 40, coils 42, lateral fastening flanges 44, a cylindrical band 46, and a mounting plate 48, is fastened on the flange 20 using screws 50. These screws hold the plate 48 against the flange 20.

The screwing of the mounting plate 48 on the flange presses an annular seal 60, preferably of O-ring type, into the housing 30 of the ball bearing, thereby pressing the ball bearing fully into the housing.

For a sealed rotor motor, as shown in the figures, a sealing bell 62 is provided to cover the whole rotor in order to separate it from the stator and assure gas-tightness between the rotor environment and the stator environment.

This bell 62 has a cylindrical wall that fits between the pole pieces of the stator and the permanent magnets of the rotor. It is thin and made of nonmagnetic metal (preferably stainless steel) or plastic, so that it can be inserted in the rotor/stator air gap without affecting the electromagnetic operation of the motor. The top of the bell, on the left in the figure, encloses the end of the rotor. The open end of the bell is bent radially outwards, parallel to the transversal flange 20 to form a rim 80 that presses against the seal 60. The plane of this rim is therefore parallel to the plane of the annular seal, in other words perpendicularly to the axis of rotation of the rotor. The rim 80 is sandwiched between the mounting plate 48 of the stator and the seal 60, such that the tightening of the plate 48 onto the flange 20 presses the rim of the bell onto the seal which in turn presses the ball bearing 28 into its housing.

Figure 2:
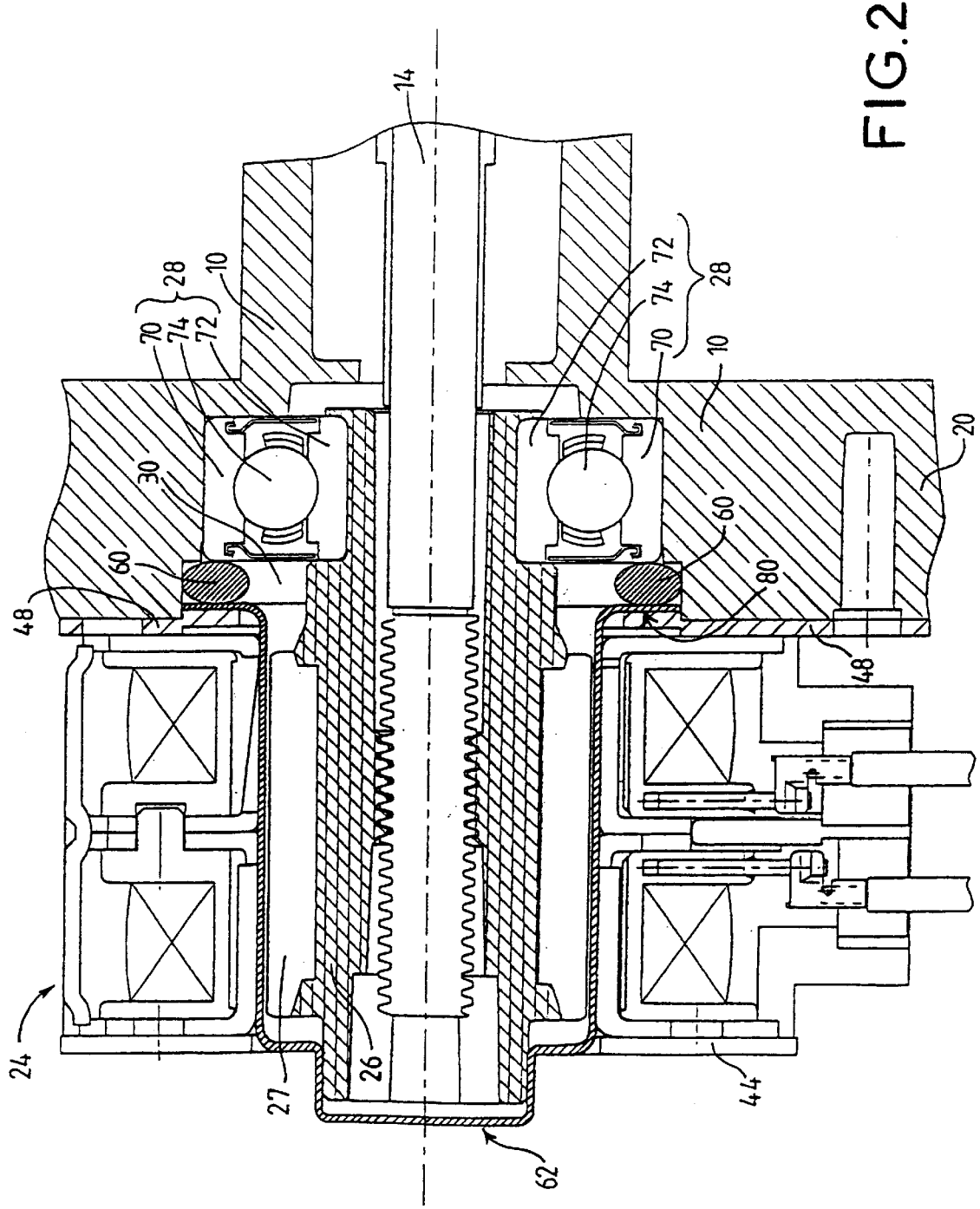
FIG. 2 shows a detailed enlarged view of the fitting of the ball bearing.

FIG. 2 shows an enlarged view of the bell 62, the seal 60 and the ball bearing 28. The housing 30 of the ball bearing is in the form of a cylindrical recess with two different diameters, the first diameter at the open end of the housing being slightly larger than the second diameter at the bottom of the recess. The first diameter accommodates the seal 60, the second accommodates the ball bearing. The ball bearing bears against the bottom of this housing 30 in which there is a hole to allow passage of the rod 14.

The ball bearing 28 includes a fixed race 70 (which does not turn when the rotor turns) and a mobile race 72 that turns under the action of the rotor. The mobile race 72 is crimped on the rotor body (ultrasound crimping in the case of a plastic body). The nominal external diameter of the fixed race is equal to the nominal internal diameter of the narrower section of the housing, the machining tolerances being chosen to enable hand-fitting of the bearing in the housing.

When the rotor assembly with its rod 14 and its ball bearing 28 is inserted in the housing containing a hole to allow passage of the rod 14, the ball bearing slides snuggly without friction into the narrower section of the housing. The seal 60, preferably of O-ring type, is then placed in the wider section of the housing 30. The external diameter of the seal (uncompressed) corresponds substantially to the internal diameter of this section of the housing; this external diameter of the seal increases when the seal is compressed towards the bottom of the housing. The seal makes a gas-tight seal on the internal cylindrical wall of the wider section of the housing 30.

The internal diameter of the O-ring is chosen to ensure a certain thickness of the O-ring in the radial direction, such that the seal bears only on the fixed race 70 of the bearing, but not other parts of the bearing.

Next, the bell 62 is fitted on the rotor. Its rim 80 fits inside the wider section of the housing 30 and presses on the seal. Then the stator assembly, mounted on its mounting plate 48, is fitted around the bell. Finally, the plate 48 is screwed onto the flange 20, which squeezes the rim 80 of the bell against the seal 60. This compresses the seal making it press axially on the fixed race 70 (thereby pressing the whole bearing assembly fully into its housing 30) and also radially against the lateral cylindrical wall of the wider section of the housing 30.

The rim of the bell preferably fits snuggly inside the housing 30, but it is the contact of the seal against the bell rim and against the wall of the housing that assures the gas-tightness and prevents any leakage of gas from one side to the other of the flange 20 via the orifice through which the rod 14 passes and notably via the ball bearing. The bell 62 confines the gas around the rotor, preventing it from passing to the stator and, more generally, preventing the gas reaching the exterior of the flange (on the left in the figures).

As we see in FIG. 2, the mounting plate 48 preferably includes at the level of the rim 80 of the bell 62, a shallow cylindrical shoulder whose diameter is the same diameter as the wider section of the housing 30. This shoulder engages in the housing 30 to assure perfect centering of the bell rim against the seal 60 in the housing 30.

The preceding description relates to a method of fitting a ball bearing that is particularly suitable for sealed rotor motors. However, it will be clear to professionals of the art that the invention has other applications.

What is claimed is:

1. An electric motor comprising:
    a support block having a ball bearing housing containing a ball bearing including a static race and a rotating race;
    a rotor projecting from said housing on one side of said support block, and a rotor shaft traversing said housing, said rotating race, and said support block;
    a stator assembly mounted around said rotor on said one side of the support block and fastened on said support block;
    an annular seal squeezed between said stator assembly and a periphery of said fixed race of the ball bearing, a pressure of said annular seal against the fixed race preventing axial and rotational movement of said fixed race; and a sealing bell sealingly surrounding said rotor on said one side of the support block, said sealing bell having a non-magnetic cylindrical portion interposed between said rotor and said stator assembly and having a rim bent radially outwards and inserted between said stator assembly and said support block, said rim being held pressed against said annular seal by the fastening of said stator onto said support block;

wherein the bell sealingly separates a first space portion containing the rotor from a second space portion containing the stator.

2. A motor according to claim 1, wherein said annular seal presses against a part of said support block to improve the sealing between said first and second space portions.

3. A motor according to claim 2, wherein said ball bearing housing comprises on a side on which the bearing is inserted, a peripheral cylindrical recess having a diameter slightly greater than that of said fixed bearing race, said annular seal being fitted in the recess of said housing, a diameter and a radial thickness of said annular seal being chosen such that the periphery presses against an internal cylindrical wall of the recess.

4. A motor according to claim 3, wherein said stator assembly comprises mounting plate bearing against said support block, and pressing said rim of said bell against said annular seal, and the mounting plate having at the position of said rim a shallow cylindrical shoulder with a diameter corresponding to the recess diameter of said housing, the shoulder engaging in said housing when said stator assembly is fitted.

5. The motor according to claim 1, wherein the annular seal comprises an O-ring type seal.

6. An assembly process for an electric motor comprising:

preparing a rotor assembly including a rotor and a ball bearing;

fitting the rotor assembly in a ball bearing housing in a support block, with said rotor projecting outside the housing on a first side of the support block, with a shaft of the rotor projecting on an opposite side of the support block through said ball bearing housing;

fitting an annular seal against a fixed race of said ball bearing;

fitting a stator assembly around the rotor; and tightening said stator assembly against said support block to squeeze said annular seal against said fixed race.

7. The assembly process according to claim 6, wherein said fitting of the stator assembly is preceded by fitting a non magnetic sealing bell around said rotor, said bell having a rim bent radially outwards that presses against said annular seal and said stator assembly.

8. The assembly process according to claim 6, wherein the annular seal comprises an O-ring type seal.

* * * * *